No. 776,167. PATENTED NOV. 29, 1904.
D. BEST.
TRAVELING HARVESTER.
APPLICATION FILED JUNE 27, 1904.
NO MODEL. 2 SHEETS—SHEET 1.
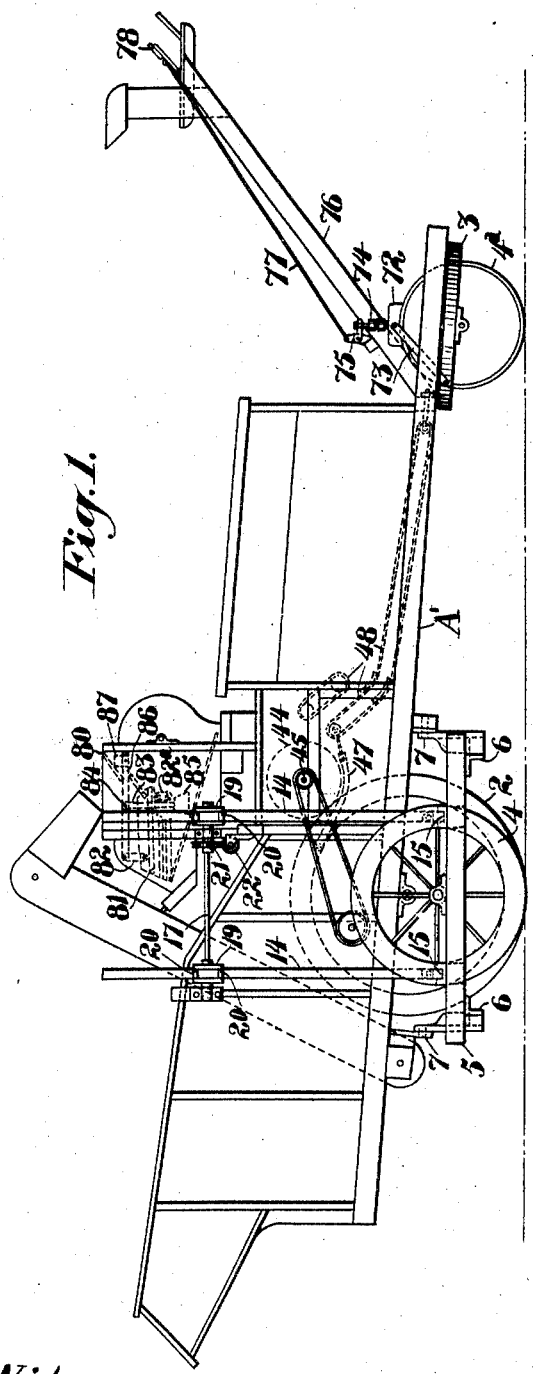
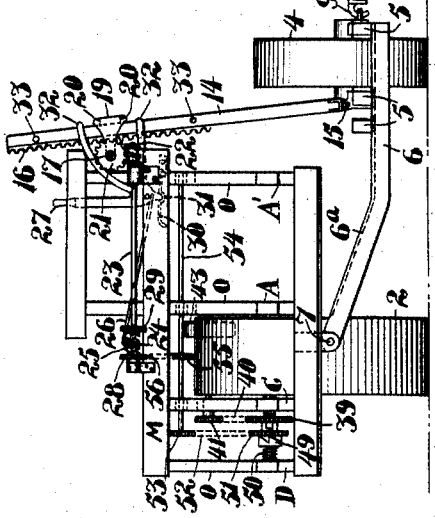
Witnesses:-
F. C. Fliedner
J. H. Amse
Inventor,
Daniel Best
By Geo. H. Strong
atty

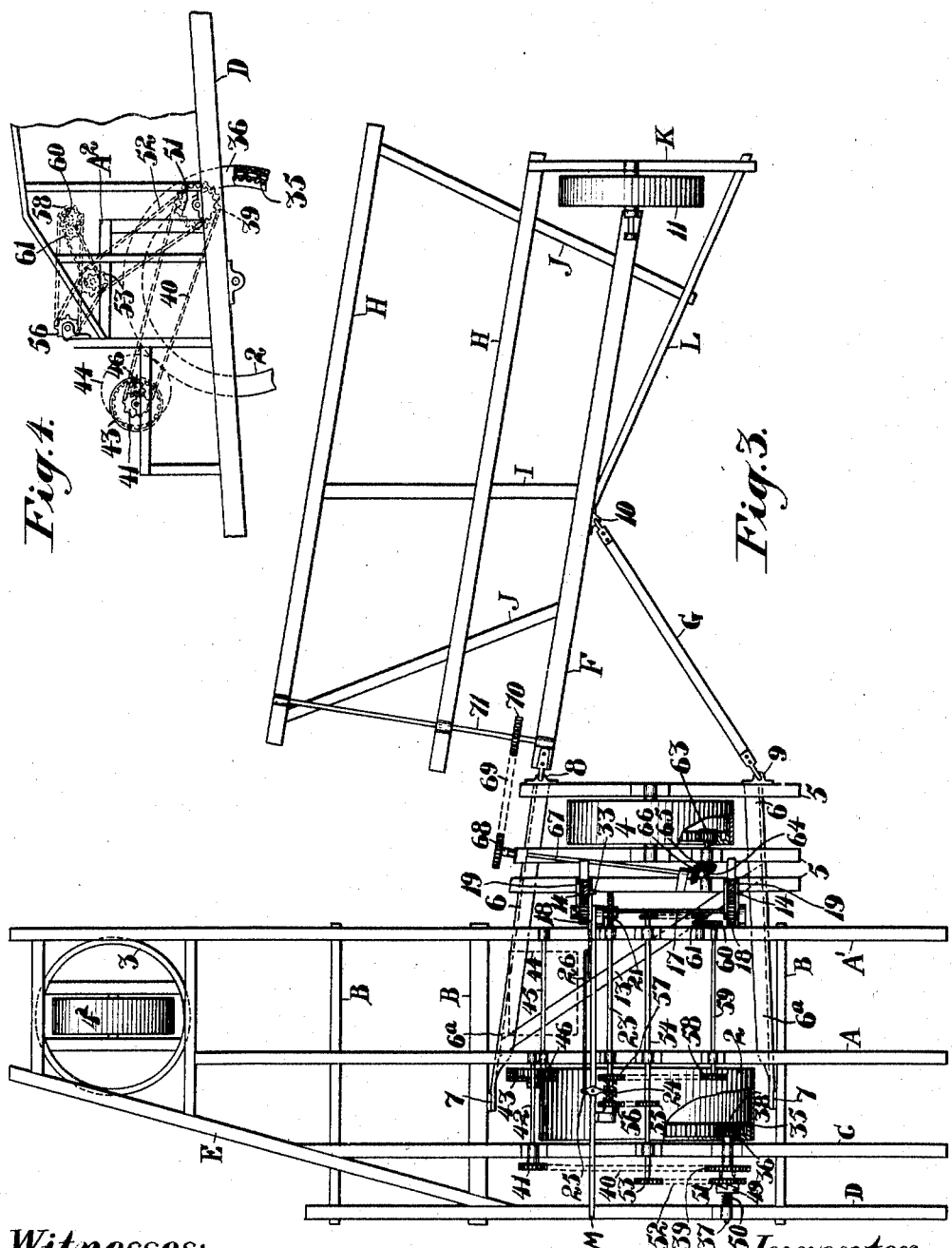

No. 776,167.

Patented November 29, 1904.

UNITED STATES PATENT OFFICE.

DANIEL BEST, OF SAN LEANDRO, CALIFORNIA.

TRAVELING HARVESTER.

SPECIFICATION forming part of Letters Patent No. 776,167, dated November 29, 1904.

Application filed June 27, 1904. Serial No. 214,303. (No model.)

*To all whom it may concern:*

Be it known that I, DANIEL BEST, a citizen of the United States, residing at San Leandro, in the county of Alameda and State of California, have invented new and useful Improvements in Traveling Harvesters, of which the following is a specification.

My invention relates to that class of harvesting machinery which is especially designed for cutting, threshing, and cleaning grain in a continuous operation and while the machine, which is mounted upon wheels, is traveling over the field in which the grain stands, the machine being propelled either by animal or mechanical power.

My invention comprises mechanism by which the threshing and cleaning mechanism of the apparatus may be maintained substantially level while the machine is traveling upon sidehills or inclined ground which would otherwise throw the mechanism out of level.

My invention also comprises a novel means for preventing twisting strains upon the frames, means for more equally dividing the weight carried upon each of the main bearing-wheels, and in dividing the power transmitted from said wheels.

It also comprises details of construction and combinations of parts which will be more fully explained by reference to the accompanying drawings, in which—

Figure 1 is a side elevation of my apparatus. Fig. 2 is a rear view of the framework, showing header-frame. Fig. 3 is a plan view of same. Fig. 4 shows relation of gearing from opposite side of Fig. 1. Fig. 5 shows the leveling of the cleaner-shoe.

In the construction of traveling harvesters the main frame consists of longitudinal and transverse sills secured together as strongly as possible and carrying the threshing and cleaning mechanism, and another frame hinged thereto projecting to one side, having an outer bearing-wheel, this second frame carrying a sickle and traveling belt or draper by which the cut grain is delivered to the feeding and threshing mechanism upon the first-named frame. Various main shafts through which power is transmitted have been ordinarily journaled across the main frame. It is impossible to prevent twisting strains upon so large a structure moving over an irregular ground, and such strains cause the journal-boxes of the shafts to bind, and thus greatly increase the draft and the power necessary to propel the machine.

In my invention I have improved the construction of the frame, have provided means for shortening the main shafts and for preventing or reducing the twisting strains upon the frames, and also a means, in conjunction with the above, for leveling the machine, so that when traveling upon sidehills the threshing and cleaning mechanism may be maintained approximately level while the header-frame is free to follow the contour of the ground, so that the sickle will cut substantially parallel with the surface.

A A are the main longitudinal sills upon which the threshing and cleaning mechanism, usually called the "separator," is supported. Transverse sills B are strongly fixed across these longitudinal sills, and upon the left side of the machine these transverse sills project and have fixed upon them two parallel and shorter longitudinal sills C and D. Between the left main sill A and the supplemental sill C a sufficient space or opening is left for the main bearing-wheel 2, which is mounted upon a short shaft journaled in boxes, which are fixed upon the above-named sills A and C. The outer sill D, in conjunction with the sill C, serves to support the journal-boxes of shafts through which motion is transmitted from the main wheel 2 to drive the mechanism of the separator, and by reason of these short shafts and exterior supports I am able to avoid in a great measure the binding of these shafts in their boxes, and the sills upon which they are journaled are supported upon the single main wheel 2 at this side, and are therefore not subjected to serious twisting strains. In order to still further strengthen the frame, a diagonal brace E extends from the outer timber D across the front end of the timber C and substantially intersects the main longitudinal sill A in conjunction with the front cross-sill at this point.

Within the front end of the frame is fixed the circular track 3, and the frame of the steering-wheel 4ᵃ is mounted to turn upon this track, by which the front end of the frame is supported, and is turnable by any suitable or usual mechanism (not here described) for the purpose of guiding the machine in its travel about the field.

The right side of the machine is supported upon the bearing-wheel 4, the shaft of which is journaled upon sills 5 of a supplemental frame, which is attached to the main frame, as follows: 6 represents transversely-disposed bars or timbers, the outer ends of which are fixed to the wheel-frame 5 at front and rear of the wheel 4. These bars 6 are preferably made of strong steel, preferably of L form in transverse section, so as to provide for sufficient rigidity. When the machine stands upon level ground, the outer portion of these connecting-bars is approximately horizontal, and from a point beneath the right-hand sill A' the bars are bent upward, as shown at 6ᵃ, extending at the angle thus formed to points substantially in line with the main left bearing-wheel 2, where they are fulcrumed or pivoted to the cross-sills B B, as shown at 7, in front of and behind the wheel 2 and exterior to the longitudinal sill A. By this construction the wheel-frame 5 is connected with the opposite or left side of the main frame and in line with the bearing-wheel 2, so that twisting strains on this part of the apparatus are substantially eliminated.

To the outer supplemental wheel-frame 5 is hinged the header-frame timber F. The connection of the timber F is here shown as being made by means of a strong hook fixed upon the inner end of the timber F and a corresponding eye or staple fixed upon the front end of the outer sill 5, as shown at 8. A strong brace-bar G has its inner end hinged to the rear of the sill 5 in the manner hereinbefore described, as shown at 9. The outer end of the timber G is in a similar manner swiveled to the timber F at a point intermediate between its inner and outer ends, as shown at 10. This construction forms a substantially triangular freely-movable frame, which, while being strongly connected with the main portion of the machine, is free to adjust itself to irregularities of the surface of the ground. The timber F is inclined backwardly with relation to the line of travel of the machine, and upon the outer end it has a journal-shaft substantially parallel with the shafts of the wheels 2 and 4, and upon this shaft is mounted the bearing-wheel 11, which supports the outer end of the header. Parallel with the timber F are the timbers H, forming the front portion of the header and supported by the transverse and diagonal timbers I and J, fixed to the timber F and extending across the timbers H, as shown. The timber K extends parallel with the wheel 11 and exterior thereto, and a bracing-timber L extends from the rear end of this timber K to a point on the timber F contiguous to the hinge 10. The outer diagonal timber J is secured across the timbers H, F, and L, thus forming with the other timbers a rigid structure and support for the header mechanism.

In order to prevent twisting strains upon the hinge-bars 6ᵃ, a diagonal brace 13 extends from near the supplemental frame 5 to a point upon the opposite bar 6 near to the hinge-point 7, thus forming a truss to prevent any distortion of this connection by reason of the side strain brought upon it from the header.

In apparatus of this kind it is desirable to maintain the separator containing the threshing and cleaning mechanism as nearly level as possible independent of any irregularities of the surface of the ground over which it must travel. At the same time the sickle-bar which is carried in front of the header-frame must be allowed to travel substantially parallel with the surface of the ground. Thus when working upon a sidehill the sickle-bar and header-frame usually project up the slope of the hill, and the separator is caused to travel as near as possible transversely of the slope, so as to maintain it nearly level in its line of travel.

In order to maintain the separator in a substantially level position trasversely, I have shown the following connection: 14 represents stout posts having the lower ends hinged to the inner supplemental frame-timber 5, as shown at 15. These posts extend upwardly near to the side of the separator-housing and carry stout straight rack-bars 16. Across the upper part of the separator-frame extend the strong transverse timbers M, which are strongly connected with the sills A C D by the vertical posts or stanchions O, and these timbers parallel with the sills B and in conjunction with the parts now to be described form a strong truss which will largely prevent any twisting strain upon the frame or the separator. Upon these timbers M and substantially parallel with the side of the separator-house is journaled a shaft 17, having fixed upon its ends pinions 18, and these pinions engage with the teeth of the racks 16. It will be seen that these pinions being keyed to the shaft 17 and maintained in mesh with the racks 16 and these racks fixed to the vertical posts 14, which in turn are hinged to the front and rear ends of the sills 5, there will be formed a rigid rectangle which cannot be distorted except by the twisting of the shaft 17 or the slipping of the pinions 18 upon it. At the same time this rectangle may be moved up and down by the rotation of the shaft 17, so that the supplemental wheel-frame 5 may be raised or depressed about the hinge-points 7 of the bars 6, by which it is connected with the opposite side of the main frame, and by reason of the angular bend of the transverse bar at 6ᵃ the wheel-frame 5 and the wheel 4 are allowed a very considerable vertical movement without interfering with the sill A' or changing the level of the separator-frame, and by this variation in the position of the wheel 4 the separator may be maintained level, while the header may be extended up or down the sidehill to a very considerable angle. In order to maintain the pinions 18 in constant mesh with the racks 16, I have shown yoke-shaped frames 19, the inner ends of which are journaled upon the shaft 17, and the outer ends carry antifrictional rollers or equivalent devices, as at 20, which contact with the outer faces of the posts 14, carrying the racks 16, and thus maintain the parts in contact. In order to revolve the shaft 17 so as to raise or depress the rack-bars 16 and the wheel-frames 5 of the wheel 4 to suit the varying conformations of the ground, I have shown a worm-wheel 21, fixed upon the shaft 17, and this wheel is engaged by a worm or screw 22, fixed upon a shaft 23, which is journaled upon one of the top transverse frame timbers M, previously described. This shaft extends across the machine, and being journaled upon this single timber is subjected to no distortion of its journal-boxes, and by extending it across the machine I am enabled to drive it by power derived from the main bearing-wheel 2, as will be hereinafter more fully described. Upon this shaft 23 a clutch member 24 is slidable upon a feather and is operated by a lever-arm 25, a rod 26, and a handle 27 within convenient reach of the operator and is here shown as situated near to the right side and top of the separator-house.

28 is a clutch member carried by a chain sprocket-wheel turning loosely upon the shaft 23, and 29 is a similar clutch member turnable upon the same shaft and upon the opposite side of the clutch member 24. The clutch members 28 29 are revolved in opposite directions by means of chain-and-sprocket wheels and mechanism by which they are turned in reverse directions, Fig. 3.

It will be seen that by shifting the clutch member 24 to engage with the member 28 the shaft 23 with its worm or screw 22 will be turned in one direction, and by shifting the clutch to engage with the member 29 it will be turned in the other direction. Thus the worm-wheel 21 which is fixed upon the shaft 17 will be revolved in either direction and carry the pinions 18 engaging the racks 16. These racks and the posts 14 to which they are fixed will be raised or depressed, carrying with them the supplemental wheel-frames 5 and the wheel journaled therein.

In order to hold the clutch member 24 normally in its disengagement and central between the other clutch members when the machine is properly adjusted for any inclination upon which it is traveling, I have shown a spring 30, having an indentation or depression, as at 31, and a point carried by the pivoted socket of the lever 27 engages with this depression, and thus holds the parts disengaged. A slight pressure in either direction upon the lever 27 will move it out of this engagement, and thus slide the clutch member 24 to engage either of the other clutch members, as previously described.

In order to prevent the timbers 14 from being raised or depressed too much by accident or oversight, I have shown a forked arm or arms, as at 32, having the inner ends fixed to and carried by the socket of the lever 27 and the outer ends extending along the side of the vertical posts 14. These posts have pins projecting from them, as shown at 33, one above and the other below the position of the arms 32, and at such a distance apart as will allow the extreme movement of the posts and racks in either direction, and when the limit of safety has been reached one or the other of these pins 33 will strike the projecting arm 32 and will thus turn the lever-bracket and disengage the clutch, which may then be in engagement, and will interlock the point of the bracket with the notch 31 of the spring-arm 30, thus leaving the apparatus in that condition until such time as it may be desired to again change it.

It will be seen that when the apparatus is working upon a sidehill, the header portion being inclined up the hill, the wheel 4 and its frame will be correspondingly inclined toward the body of the separator and considerable weight will thus be thrown upon the hinge-arms 6. This weight is supported in a great measure by the left bearing-wheel 2 and in the plane of said wheel by reason of the connection of the arms 6 with the frame-timbers in line before and behind said wheel, as shown at 7. The weight thus transferred adds to the ground friction and tractive power of the main bearing-wheel, and the weight thus transferred and equalized makes it possible to drive all the mechanism of the separator from this wheel and greatly assists in overcoming side draft, which is a very serious difficulty in this class of machines where so much of the strain is brought upon the projecting header and cutting mechanism. By thus driving all portions of the threshing, separator, and cleaning mechanism from the left wheel and driving the sickle, carrying-draper, and mechanism of the header from the right wheel the machine is much more perfectly balanced and the side draft and consequent strain and twist upon the frame are almost entirely avoided. The bearing-wheels 2 and 4 have internally-toothed gear-segments fixed within their peripheries, as shown at 35, with annular exterior flanges, as at 36, to in a measure protect these gears from dirt and foreign substances which might otherwise be carried into the wheels.

The method of securing the segments within the wheel-rims is well shown in Figs. 3 and 4.

37 is a short shaft journaled upon the exterior longitudinal timbers C and D. Upon the inner end of this shaft is keyed a pinion 38, which meshes with the gear 35 of the bearing-wheel 2. Upon this shaft is carried a sprocket-wheel 39, and from this sprocket-wheel a chain 40 passes around a sprocket 41, fixed upon a shaft 42, which is journaled upon horizontal frame-timbers substantially in the plane of the threshing cylinder-shaft. This shaft 42 has fixed to it an internal gear 43.

44 is a threshing-cylinder, and its shaft 45 is journaled and extends out into the plane of revolution of the internal gear 43 and has fixed upon its outer end a pinion 46, which engages with the internal gear 43. Motion is thus transmitted to drive the threshing-cylinder, which revolving within the usual toothed concave, as at 47, serves to thresh the grain which is delivered between the threshing-cylinder and concave by feeder-belts, as at 48. The lowermost of these belts receives the grain, which is delivered upon it from the header by the usual carrying-belt of said header. (Not here shown.)

A toothed clutch 49 is mounted upon the shaft 37, and the members of the clutch are normally held in engagement by a spring 50; but when by reason of the slowing down or stoppage of the apparatus the weight and high speed of the cylinder cause it to continue its momentum the teeth of this clutch will slip, so as to allow the movement of the cylinder without strain upon the sprockets and chains by which motion is transmitted, and this movement of the cylinder continuing after the forward movement and supply of straw to the cylinder has partially or wholly ceased serves to thresh what has already been received and to substantially clear the cylinder and concave in readiness for a further forward movement and supply.

51 is a second sprocket-wheel mounted upon the shaft 37, and by means of a chain 52, passing around a sprocket-wheel 53, mounted upon a shaft 54, which is journaled upon supplemental frame-timbers $A^2$, Fig. 4, motion is transmitted to revolve this shaft. By means of sprocket 55, mounted upon this shaft, and a chain transmitting motion from this sprocket to the sprocket-wheel 56, which carries the member 28 of the reversing-clutch, this part of the clutch is revolved in one direction. The other member, 29, of the reversing-clutch is carried by the sprocket 57, and this sprocket has a reverse motion transmitted to it by chain from the sprocket 58, mounted upon a shaft 59, which carries the gear 60, and this, meshing with the gear 61, has a reverse movement which it transmits, as previously described, to the clutch member 29. 61 is driven by chain from shaft 54. The carrying-belts, riddles, straw-carrier, beaters, and the mechanism of the supplemental cleaner are also all driven from this side of the machine. The wheel 4 upon the opposite side of the machine has an internal gear. This engages and drives the pinion 63 upon a shaft 64, which is journaled upon the frame-timbers 5. Upon this shaft is a bevel-gear 65, which engages with a bevel-pinion 66, fixed upon the shaft 67. This shaft is also journaled upon and movable with the frame-timbers 5, and upon its front end it carries a sprocket-wheel 68, and this transmits power through a chain 69 to drive the sprocket-wheel 70, which is fixed upon the shaft 71, journaled transversely of the header-frame. From this shaft power is transmitted to drive the draper or carrying-belts, the cutting-sickle, the grain-reel, and the other moving parts carried by the header.

In order to control the movements of this apparatus, I employ a band-brake upon the main wheel 2, as shown in a former patent issued to me August 9, 1887, No. 367,965, and in addition to this I also employ a brake upon the forward or steering wheel, as shown at 72. As the swivel or steering wheel $4^a$ is turnable with its supporting-ring or turn-table 3, it is necessary to maintain this brake in line with the wheel, which is effected by means of links 73 connecting the brake with the turn-table.

74 is a swivel-joint forming a connection with a bell-crank lever 75, which is carried upon the seat-supporting timber 76, these timbers extending upwardly and forwardly from the main frame, as shown.

77 is a rod or connection between the bell-crank lever 75 and the foot-lever 78, located within easy reach of the driver, and this enables the driver to apply any desired amount of braking power to the front wheel, and thus greatly assist in the control of the machine.

After leaving the riddles and cleaning mechanism of the main portion of the separator the grain is elevated and delivered into a supplemental cleaner, as at 80. Within this cleaner is a shoe containing screens and riddles, as at 81. This cleaner is located, as before stated, directly over the main bearing-wheel, and thus adds its weight to this portion of the apparatus and serves to both increase the tractive force of the wheel and to relieve the opposite side of the machine of superfluous weight. In addition to the leveling of the machine transversely by means heretofore described it is desirable to maintain the screens of this supplemental cleaner in their normal position in the direction of the length of the machine when the latter is passing over irregularities which would change its level in the direction of the length. In order to level the shoe and screens of this cleaner, I have shown the shoe as suspended by links 82 and $82^a$.

83 is a hanging rod or bar pivoted, as at 84, and upon the lower end of this rod is a weight 85.

86 is a bar extending substantially at right angles with 83 and connected at the point 84. Upon the outer end of the bar 86 is a weight 87. The link 82 is connected with the pivotal point 84, and whenever the front or rear of the machine is raised or depressed the action of the weights through the connecting-links will swing the shoe so as to maintain the screens therein in their normal position, and thus the passage of the grain over these screens will not be either retarded or accelerated.

Having thus described my invention, what I claim, and desire to secure by Letters Patent, is—

1. In a traveling harvester, a main frame, a main bearing-wheel journaled upon one side of said frame, a supplemental frame exterior to the opposite side of the main frame, and a wheel journaled therein, arms fixed to said supplemental frame extending transversely beneath the main frame, and having their opposite ends pivoted in the line of travel of the main bearing-wheel, mechanism connecting the main and supplemental frames whereby the supplemental frame may be raised and depressed, and a header-frame hinged to the supplemental wheel-frame.

2. In a traveling harvester, a main frame, a supplemental frame parallel therewith, a bearing-wheel journaled upon the left of the main frame, and a wheel independently journaled in the supplemental frame, a header-frame hinged to the supplemental wheel-frame, arms fixed to the supplemental frame, extending transversely beneath the main frame and hinged before and behind, and in the line of travel of the main wheel, vertical rack-bars hinged to the supplemental wheel-frame, a shaft journaled upon the main frame with pinions engaging the rack-bars, a worm-gear and reversing mechanism whereby said shaft is revolved.

3. A traveling harvester comprising parallel main and supplemental frames and a header-frame hinged to the supplemental frame, a main bearing-wheel journaled upon the left of the main frame, a wheel journaled in the supplemental frame, transverse L-iron bars fixed to the supplemental frame extending inwardly to the line of the main frame in substantially the plane of the supplemental frame, and bent upward beneath the main frame, said bars having their outer ends pivoted in line with and in front and behind the main wheel, and mechanism connecting the main and supplemental frames whereby said supplemental frame may be raised or depressed.

4. A traveling harvester comprising parallel main and supplemental frames and a header-frame hinged exterior to the supplemental frame, a main bearing-wheel journaled upon the left of the main frame, a wheel journaled in the supplemental frame, transverse bars fixed to the supplemental frame extending inwardly with the first portion substantially parallel with the supplemental frame, said bars being bent upwardly beneath the main frame having their outer ends pivoted in line in front and behind the main bearing-wheel, a diagonal brace connecting opposite ends of said transverse bars and mechanism connecting the main and supplemental frames whereby said supplemental frame may be raised or depressed.

5. A traveling harvester comprising parallel main and supplemental frames and a header-frame hinged to the supplemental frame, a main bearing-wheel journaled to the left of the main frame, and a wheel journaled in the supplemental frame, transverse bars fixed to the supplemental frame and bent upwardly beneath the main frame and pivoted in line with the main bearing-wheel, vertically-movable rack-bars hinged to the supplemental frame, a shaft having pinions engaging the rack-bars and mechanism whereby the rotation of the shaft may be reversed, timbers transversely above and parallel with the transverse sills of the lower part of the main frame and vertical connections therewith, and journal-boxes for said pinion-shaft.

6. A traveling harvester having in combination a wheeled main frame, a header-frame, a supplemental frame interposed between the main frame and header-frame, transverse bars rigid with the supplemental frame and hinged to the main frame in line with the bearing-wheel thereof, and means for raising and depressing the supplemental frame said means comprising vertically-movable rack-bars having their lower ends hinged to the supplemental-frame ends, a shaft journaled upon the upper portion of the main frame, pinions fixed to said shaft, means including yoke-shaped frames having their inner ends journaled upon said shaft, for holding the pinions in engagement with the rack-bars, and mechanism by which the pinion-shaft may be turned.

7. In a traveling harvester, the combination of the main frame, the header-frame, a supplemental frame interposed between the main frame and header-frame, and parallel with both frames, transverse bars rigid with the supplemental frame and hinged to the main frame in line with the bearing-wheel thereof, vertically-movable rack-bars hinged to the supplemental frame, a shaft journaled upon the upper part of the main frame, pinions on said shaft engaging said rack-bars, said supplemental frame, the rack-bars and the shaft stiffening the frames and resisting torsional movement, a worm-wheel, a transversely-journaled worm-shaft, and mechanism by which said worm-shaft may be driven and reversed, a fulcrumed lever connected with said mechanism, and a spring-latch with which the lever is engaged to hold the mechanism out of engagement.

8. In a traveling harvester, the combination of the main bearing-wheel, the main frame, the header-frame at one side thereof, a supplemental wheeled frame interposed between the main frame and header-frame, transverse bars rigid with the supplemental frame and having inner ends pivotally mounted in the line of travel of the main bearing-wheel, and a rectangular stiffening means for preventing torsional movement of the frames said means comprising parallel rack-bars extending vertically from and hinged to the supplemental frame, and a shaft supported on the main frame parallel with the supplemental frame and substantially at right angles with the rack-bars, and pinions on the shaft engaging said bars.

9. In a traveling harvester, a wheeled main frame, a supplemental frame parallel therewith, transverse bars rigid with the supplemental frame, and hinged to the main frame in line with the bearing-wheel thereof, vertically-movable rack-bars hinged to the supplemental frame, a shaft journaled on the upper part of the main frame having fixed to it a worm-gear and pinions engaging the rack-bars, a transverse shaft with a worm engaging the gear, and clutch mechanism by which its movement may be reversed, a lever connected with the movable clutch member, an arm projecting from the lever into the line of motion of one of the rack-bars and pins upon the rack-bar to engage said arm and disengage the clutch and terminate the movement of the racks in either direction.

10. A harvesting apparatus comprising a wheeled main frame and a header-frame, said main frame including longitudinal sills, lower transverse timbers and corresponding transverse timbers located above and connected with the sills by vertical posts, a supplemental wheel-frame parallel with one side of the main frame and interposed between the main frame and header-frame, diagonally-braced transverse bars rigid with the supplemental frame extending across beneath the main frame, with the opposite ends pivoted to transverse sills in line with the main bearing-wheel, vertically-movable rack-bars having their lower ends hinged to the supplemental frame and the upper ends engaged by pinions, a shaft journaled upon the upper main frame substantially parallel with the longitudinal timbers of the two frames upon which shaft the pinions are fixed, and mechanism by which the shaft is rotated and reversed.

11. In a harvesting apparatus parallel main and supplemental frames, a header-frame hinged to the supplemental frame, a wheel journaled in the supplemental frame, a main wheel journaled on the left of the main frame, and means for transferring and equalizing the weight of the connected parts, said means comprising transverse bars fixed to the supplemental frame extending across beneath the main frame and pivoted to transverse sills in front of and behind the main wheel and in its line of travel.

12. In a traveling harvester, a main frame having threshing and cleaning mechanism mounted thereon and a bearing-wheel journaled on the left side, a supplemental wheel-frame at the right side, transverse bars fixed to said frame and hinged to the main frame in the line of travel of the main wheel, a header-frame hinged to the supplemental wheel-frame, and means for equalizing the application of power, said means consisting of mechanism connecting the left wheel with the threshing, cleaning and conveying devices, and other independent mechanism connecting the supplemental wheel with the sickle, and conveying apparatus of the header.

13. In a traveling harvester, a main frame with threshing-cylinder and separating and cleaning mechanism and a bearing-wheel journaled on the left side, a supplemental wheel-frame at the right side, a header-frame hinged to said wheel-frame, transverse bars fixed to said wheel-frame extending beneath the main frame and hinged in front of and behind the main wheel, an internal gear carried by the main bearing-wheel, a shaft journaled exterior to the main wheel, having a spur-gear engaging the main-wheel gear and a sprocket-wheel, a shaft journaled in front of the main wheel to which motion is transmitted from said sprocket-wheel, an internal gear fixed to the last-named shaft, a threshing-cylinder shaft, and a spur-gear thereon engaging said internal gear.

14. In a traveling harvester, a main frame with threshing, separating and cleaning mechanism and a bearing-wheel journaled upon the left side, a supplemental wheel-frame at the right side, a header-frame hinged to said wheel-frame, transverse bars fixed to the supplemental frame extending across the main frame and hinged thereto in the line of travel of the main wheel, internal gears carried by both bearing-wheels, counter-shafts, sprocket-wheels, chains, and an internal gear driven from the main-wheel sprockets, a cylinder-shaft and a gear thereon engaging the internal gear, and chains through which motion is also transmitted from the main wheel to the separating and cleaning mechanism, a shaft with spur-pinion engaging the gear of the supplemental wheel, a transmission-shaft and sprockets and chains by which the sickle reel and draper are driven.

15. A traveling harvester comprising main, supplemental and header frames, main and supplemental bearing-wheels, and transverse connecting-bars as shown, an internal gear carried by the supplemental bearing-wheel, a counter-shaft journaled upon the supplemental frame interior to the wheel, a shaft journaled diagonally upon and extending to the front of said frame, spur and bevel gears through which motion is transmitted from the bearing-wheel, a shaft journaled upon the header-frame substantially parallel with the diagonal shaft, and sprockets and chains by which motion is transmitted to said header-shaft.

16. A traveling harvester comprising main and supplemental frames and bearing-wheels journaled thereon, a header-frame connected to the outer side of the supplemental frame, transverse bars fixed to the supplemental frame and hinged to the main frame, a supplemental cleaner carried upon the main frame, mechanism connecting the main and supplemental frames whereby the former frame is maintained substantially level transversely and the latter frame is adjustable up or down, and suspending means by which the normal level of the cleaner is maintained in the direction of travel of the machine.

In testimony whereof I have hereunto set my hand in presence of two subscribing witnesses.

DANIEL BEST.

Witnesses:
D. B. RICHARDS,
J. J. SCRIVNER.